(12) United States Patent
Tawa et al.

(10) Patent No.: US 8,481,182 B2
(45) Date of Patent: Jul. 9, 2013

(54) MAGNETIC RECORDING MEDIUM FOR THERMALLY ASSISTED MAGNETIC RECORDING

(75) Inventors: Fumihiro Tawa, Kawasaki (JP); Wataru Odajima, Kawasaki (JP); Shinya Hasegawa, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 505 days.

(21) Appl. No.: 12/776,858

(22) Filed: May 10, 2010

(65) Prior Publication Data
US 2010/0290148 A1 Nov. 18, 2010

(30) Foreign Application Priority Data
May 12, 2009 (JP) .................................. 2009-115664

(51) Int. Cl.
*G11B 5/66* (2006.01)
(52) U.S. Cl.
USPC ....................................... 428/831; 428/831.2
(58) Field of Classification Search
USPC .............................................. 428/831, 831.2
See application file for complete search history.

(56) References Cited

U.S. PATENT DOCUMENTS

| 2005/0213436 A1 | 9/2005 | Ono et al. |
| 2006/0154110 A1* | 7/2006 | Hohlfeld et al. ............... 428/823 |
| 2008/0026255 A1* | 1/2008 | Das et al. ................... 428/831.2 |

FOREIGN PATENT DOCUMENTS

| JP | 2005-056504 A | 3/2005 |
| JP | 2005-317178 A | 11/2005 |
| JP | 2008-210447 A | 9/2008 |

OTHER PUBLICATIONS

Filmetrics Refractive Index Database (www.filmetrics.com/refractive-index-database), Sep. 2012.*

* cited by examiner

*Primary Examiner* — Holly Rickman
(74) *Attorney, Agent, or Firm* — Sughrue Mion, PLLC

(57) ABSTRACT

A magnetic recording medium used for the thermally assisted magnetic recording system which fires a laser beam at a magnetic recording medium to partially heat the medium and applies a magnetic field from the outside to the part heated to lower the coercivity for recording. The magnetic recording medium is configured by a glass substrate on which a heat radiation layer, heat retention layer, intermediate layer, and recording layer are stacked. Further, the heat retention layer is configured by a member having an effective refractive index lower than the effective refractive index of the recording layer and having a temperature diffusion coefficient determined by the specific heat, density, and heat conductivity rate higher than glass and lower than metal. The material with a high temperature diffusion coefficient is used lowered in temperature diffusion coefficient using a porous structure or granular structure.

6 Claims, 8 Drawing Sheets

--PRIOR ART--

| LUBRICATION LAYER | [ORGANIC MATERIAL] | 48 |
| PROTECTIVE LAYER | [DLC (3nm)] | 47 |
| UPPER RECORDING LAYER | [TbFeCo (3~10nm)] | 46U |
| LOWER RECORDING LAYER | [FePt, GRANULAR MAGNETIC FILM] (10~15nm) | 46L |
| BASE LAYER (INTERMEDIATE LAYER) | [Ru, MgO (15~25nm)] | 43 |
| HEAT RADIATION LAYER | [Cu, Al, Ag, Au, Pt, Ti (50nm)] | 41 |
| SUBSTRATE | [Glass] | 40 |

FIG.3

--PRIOR ART--

FIG.4

--PRIOR ART--

MAGNETIC RECORDING MEDIUM FOR THERMALLY ASSISTED MAGNETIC RECORDING

CROSS-REFERENCE TO RELATED APPLICATION

This application claims priority from, and incorporates by reference the entire disclosure of, Japanese Patent Application No. 2009-115664, filed on May 12, 2009.

BACKGROUND OF THE INVENTION

1. Field of the Invention

The present application relates to a magnetic recording medium, more particularly relates to the configuration of a magnetic recording medium for thermally assisted magnetic recording.

2. Description of the Related Art

In recent years, to increase the recording capacities of magnetic recording media, magnetic recording media have been raised in density. On the other hand, if magnetic recording media are raised in density, the problem of the magnetically recorded data ending up being erased due to the effects of the surrounding heat, that is, heat fluctuation, arises. To avoid the problem of heat fluctuation, it is necessary to raise the coercivity of the magnetic material used for the recording medium. However, if raising the coercivity of the magnetic material too much, existing magnetic heads can no longer be used for recording. A thermally assisted magnetic recording system uses a laser beam to heat the recording medium and record data so as to avoid the problem of heat fluctuation of the recording medium.

The thermally assisted magnetic recording system fires a laser beam on a recording layer of the recording medium through a protective layer and heats the recording layer up to near the Curie temperature to lower the coercivity and thereby enable use of an existing magnetic head for magnetic recording. In the thermally assisted magnetic recording system, when the recording layer falls in temperature after the laser beam stops being fired, the recording layer recovers in coercivity, so resistance to heat fluctuation can be given. That is, in the thermally assisted magnetic recording system, a laser beam is fired to change the temperature of the recording layer between the Curie temperature and device temperature and change the coercivity.

To improve the recording density in the thermally assisted magnetic recording system, it is necessary to reduce the write magnetic field by the head in the track width direction and simultaneously reduce the diameter of the heat spot of the recording layer reaching near the Curie temperature. Here, if defining the diameter of the heat spot as the half value width of the heat distribution and the diameter of the light spot as the half value width of the optical intensity distribution, in general the diameter of the heat spot is larger than the diameter of the light spot. This is due to the fact that when the recording layer is heated by light, the heat simultaneously diffuses in all directions. Further, the diameter of the heat spot fluctuates in size or shape due to the speed of the part heated by the light moving on the recording medium and the physical coefficient relating to the heat diffusion of the configuration material.

This thermally assisted magnetic recording system has up until now been used for removable optical disks for optomagnetic recording etc. The diameter of the light spot and diameter of the heat spot at this time have been about the wavelength. On the other hand, if aiming at a high density and large capacity with a recording capacity higher than the optical disk of over 1 Tb/inch$^2$, the recording bit has to be tens of nm or less. The diameter of the heat spot required for a magnetic disk to realize a high density and large capacity is smaller than the wavelength of tens of nm or so. The diameter of the light spot is required to be further smaller in size. The structure of a recording medium for thermally assisted magnetic recording applied to such an optical disk is shown in Japanese Unexamined Patent Publication (Kokai) No. 2005-56504 (in particular FIG. 2). Further, the structure of a recording medium used for the magnetic disk is shown in Japanese Unexamined Patent Publication (Kokai) No. 2008-210447 (in particular FIG. 3). Furthermore, the structure of a recording medium for perpendicular recording considering the backing layer as well is shown in Japanese Unexamined Patent Publication (Kokai) No. 2005-317178 (in particular FIG. 4).

In this regard, in this thermally assisted magnetic recording system, there is the problem that in the optical head generating a small light spot of the wavelength or less, the more the diameter of the light spot is reduced below the wavelength, the more the amount of light fired on the recording medium is reduced. Therefore, to deal with the problem of the reduction of the amount of light, in the recording medium, it is important to (1) efficiently generate heat at the recording layer and (2) reduce the size of the heat distribution reaching the temperature required at the recording layer. Further, to efficiently generate heat at the recording layer, it may be considered to (1A) efficiently convert light to heat and (1B) increase the amount of light supplied to the recording layer.

To efficiently convert light to heat, it is known that it is recommended to use a material with a large complex refractive index for the material of the recording layer. Further, it is learned that to increase the amount of light supplied to the recording layer, it is sufficient to place an interference layer below the recording layer and place a reflection layer at the opposite side of the interference layer from the recording layer. For this interference layer, in general, a high refractive index material is used, while for the reflection layer, aluminum or gold is used. However, this method cannot be used in the thermally assisted magnetic recording system. The reason is that for causing interference, a light path difference of about ½ of the wavelength is necessary. For example, in the light sources used in a recording device, the wavelength of the blue semiconductor laser with a wavelength of 400 nm is the shortest. Therefore, the light path difference becomes 200 nm. However, the diameter of the light spot necessary for the thermally assisted magnetic recording system used for a magnetic disk has to be made about 1/10 or the wavelength or tens of nm or less. The size is wrong. For this reason, there is the problem that it is not possible to place an interference layer below the recording layer and increase the amount of light.

On the other hand, to reduce the size of the heat distribution reaching the temperature required at the recording layer, it is necessary that the heat not easily diffuse at the recording layer. However, if making heat hard to diffuse in the recording layer, time is required for cooling the recording layer. In the thermally assisted magnetic recording system, it is necessary to rapidly heat the recording medium, then rapidly cool it. Therefore, in the thermally assisted magnetic recording system, it is better to give directionality to the diffusion of heat so that the heat escapes downward without spreading in the recording track direction or surface direction.

In Japanese Unexamined Patent Publication (Kokai) No. 2008-210447 and Japanese Unexamined Patent Publication (Kokai) No. 2005-317178, reduction of the size of the heat spot of the recording layer was sought, but it was necessary to increase the amount of light. Another method for dealing with this problem of increased light is shown in Japanese Unexamined Patent Publication (Kokai) No. 2005-317178, but with this method, the heat ends up diffusing in the horizontal direction. This runs counter to the reduction of the heat spot. Further, there is the problem that it is not possible to use a structure of a recording medium for an optical disk when using a perpendicular magnetic recording system for the thermally assisted magnetic recording system.

SUMMARY OF THE INVENTION

Therefore, the present application provides a magnetic recording medium using the thermally assisted magnetic recording system to record information, without regard to horizontal magnetic recording or perpendicular magnetic recording, which can efficiently perform heating able to reach the Curie temperature and which can realize a fine diameter of the heat spot of tens of nm or less.

A magnetic recording medium of the present application is a magnetic recording medium used for a thermally assisted magnetic recording system which fires a laser beam on the magnetic recording medium, heats the part of the magnetic recording medium on which the laser beam is fired to lower the coercivity, and applies to the part falling in coercivity a magnetic field from the outside for recording, which medium is provided with a heat radiation layer provided at a substrate side of the magnetic recording medium, a recording layer provided at a surface side of the magnetic recording medium, and a heat retention layer provided between the heat radiation layer and recording layer, the heat retention layer configured by a member having an effective refractive index lower than the effective refractive index of the recording layer and having a temperature diffusion coefficient determined by a specific heat, density, and heat conductivity rate higher than glass and lower than metal.

According to the present application, it is possible to provide a magnetic recording medium using the thermally assisted magnetic recording system to record information without regard to horizontal magnetic recording and perpendicular magnetic recording where it is possible to efficiently perform heating able to reach the Curie temperature, possible to realize a fine diameter of the heat spot of tens of nm or less, and able to reduce the amount of light fired from the optical head.

BRIEF DESCRIPTION OF THE DRAWINGS

The present invention is illustrated by way of example, and not limitation, in the figures of the accompanying drawings in which like references indicate similar elements. Note that the following figures are not necessarily drawn to scale.

DESCRIPTION OF THE PREFERRED EMBODIMENTS

Before describing the preferred embodiments, an explanation will be given of the conventional thermally assisted magnetic recording medium shown in FIGS. 1 to 4.

Figure 1:
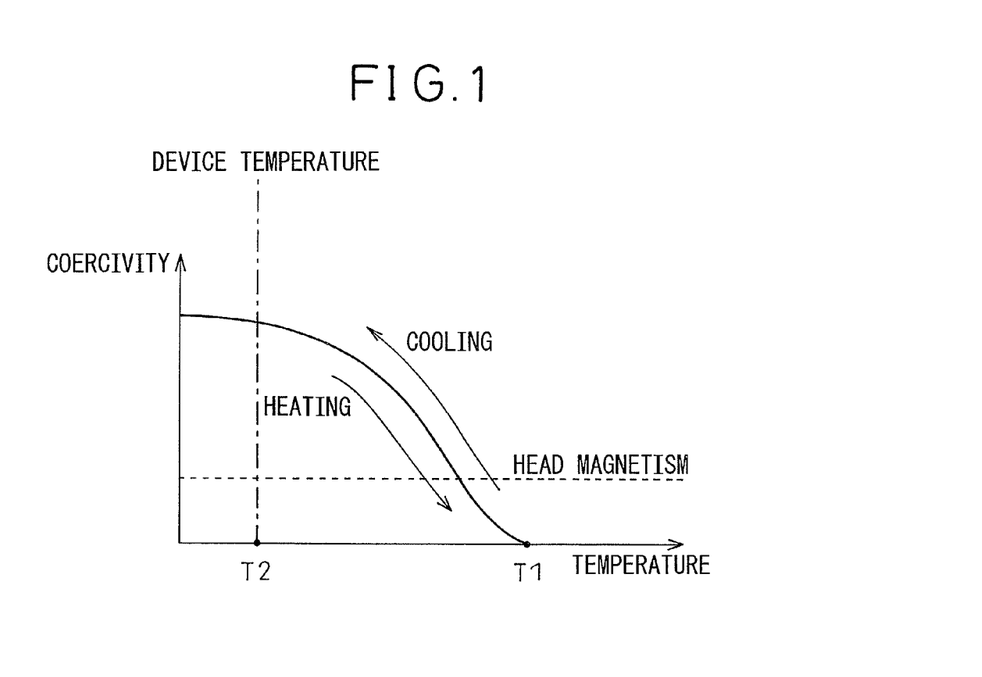
FIG. 1 is a graph showing the relationship of coercivity with respect to temperature of a recording layer of a magnetic recording medium in a thermally assisted magnetic recording system.

FIG. 1 shows the relationship of the coercivity to temperature of a recording layer of a recording medium in a magnetic recording device of a thermally assisted magnetic recording system. The temperature at the time of use of the device is T2, while T1 shows the Curie temperature. From this FIG. 1, it will be learned that due to the laser beam being fired on the recording medium, the temperature of the recording layer of the recording medium changes between the Curie temperature T1 and device temperature and the coercivity changes.

Figure 2:
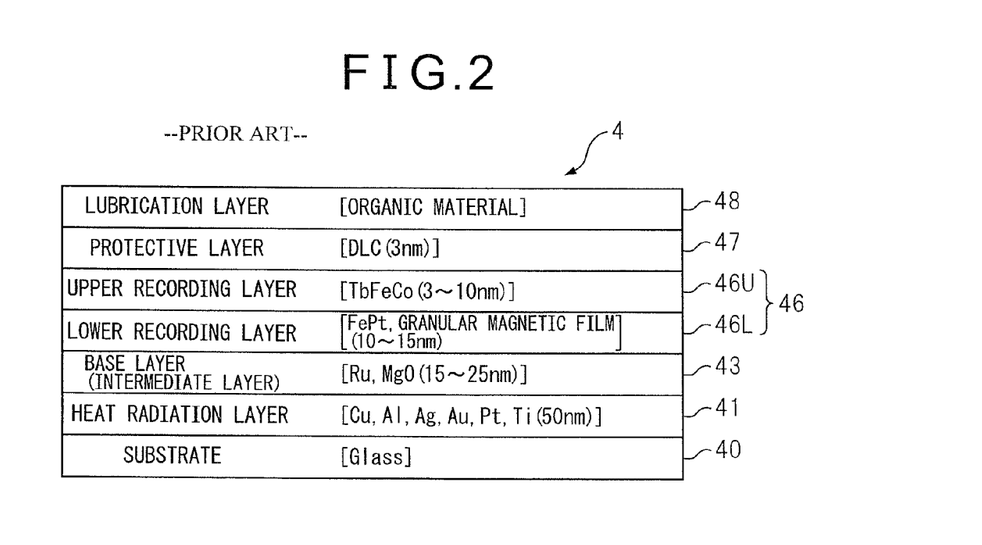
FIG. 2 is a cross-sectional view of an example of the configuration of a conventional recording medium.
Figure 3:
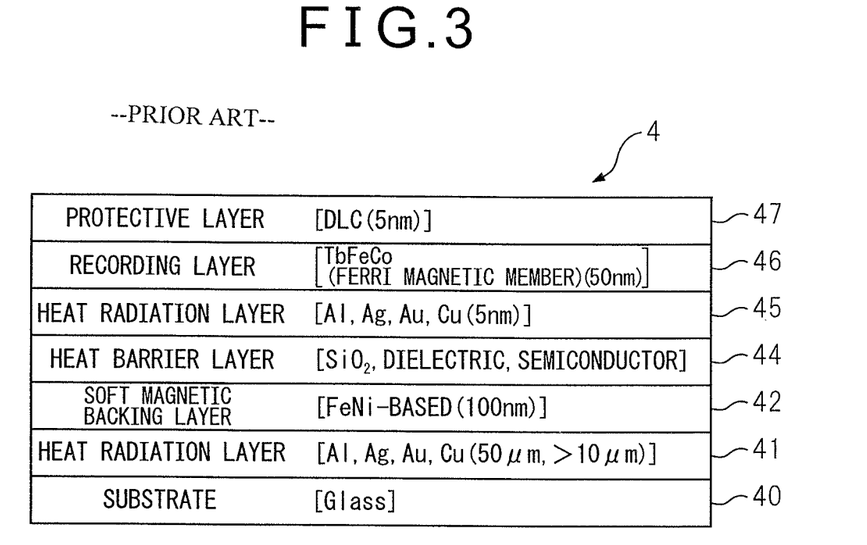
FIG. 3 is a cross-sectional view of an example of the configuration of a conventional recording medium.

FIG. 2 shows the configuration of the recording medium 4 shown in Japanese Unexamined Patent Publication (Kokai) No. 2008-210447. The recording medium 4 is configured by a glass substrate 40 on which a heat radiation layer 41, base layer (intermediate layer) 43, lower recording layer 46L and upper recording layer 46U comprising a recording layer 46, protective layer 47, and lubrication layer 48 are stacked. FIG. 3 shows the configuration of the recording medium 4 shown in Japanese Unexamined Patent Publication (Kokai) No. 2005-317178. The recording medium 4 is configured by a glass substrate 40 on which a heat radiation layer 41, soft magnetic backing layer 42, heat barrier layer 44, heat radiation layer 45, recording layer 46, and protective layer 47 are stacked.

In the recording medium 4 shown in FIG. 2 and FIG. 3, an aluminum, copper, or other heat radiation layer 41 having a temperature diffusion coefficient with the specific heat, density, and heat conductivity rate as variables of for example several times larger than iron was arranged below the recording layer 46. In this configuration, considerable heat can escape downward from the horizontal direction, so the diameter of the heat spot of the recording layer 46 can be reduced.

However, to obtain the temperature required at the recording layer 46 by firing light at the recording medium 4, it was necessary to increase the amount of the laser light by the extent of the escape of heat to the heat radiation layer 41. As another method for dealing with this problem of increased light, there is the method of raising the heating temperature while considering the spread of the heat spot. For example, in Japanese Unexamined Patent Publication (Kokai) No. 2005-317178, a heat insulating layer or heat barrier layer 44 using a dielectric material, for example, silicon dioxide [$SiO_2$] or other oxide, is inserted between the recording layer 46 and heat radiation layer 41. However, if placing a material with a large heat insulating effect such as an oxide between the recording layer 46 and heat radiation layer 41, the heat will not escape in the downward direction, but will diffuse in the horizontal direction, so this would end up running counter to the reduction of the diameter of the heat spot.

Figure 4:
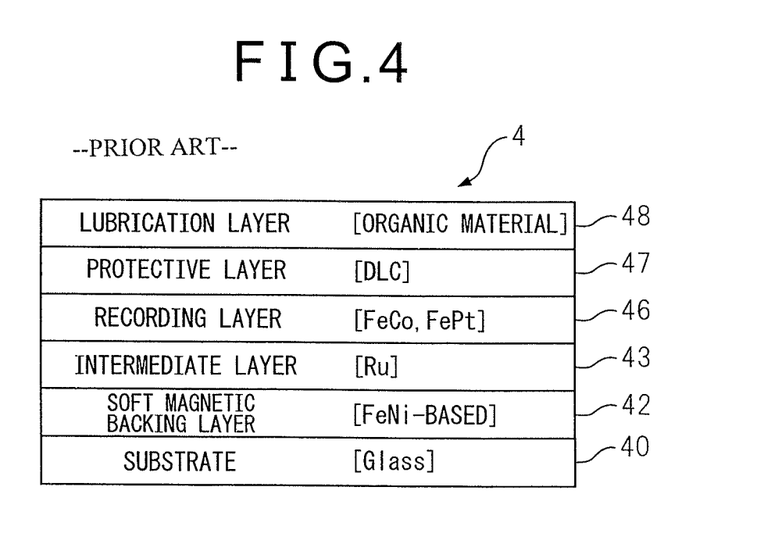
FIG. 4 is a cross-sectional view of another example of the configuration of a conventional recording medium.

Further, the recording medium 4 of the vertical magnetic recording system is configured as shown in FIG. 4. The recording medium 4 is configured by a glass substrate 40 on which a soft magnetic backing layer 42, intermediate layer 43, recording layer 46, protective layer 47, and lubrication layer 48 are stacked. FIG. 4 is simplified, but the actual layers are multiple layers. When using the perpendicular magnetic recording system for the thermally assisted magnetic recording system, it is necessary to provide the intermediate layer 43 and soft magnetic backing layer 42 below the recording layer 46. This backing layer 42 is one which efficiently pulls in the leakage magnetic flux generated from the vertical magnetic record head to the medium. The further from the recording layer 46, the smaller the effect, so there is the problem that the structure of the recording medium for an optical disk such as shown in FIG. 2 cannot be used. Further, in the configuration of FIG. 3, there is the problem that by the insertion of the heat radiation layer 45 and heat barrier layer 44 between the recording layer 46 and the backing layer 42, the effect of reduction of the diameter of the heat spot becomes smaller.

The present invention solves the above problems of the prior art. Below, embodiments of the present invention will be explained in detail based on specific examples. Note that, for simplifying the explanation, members the same as members used in the recording media for thermally assisted magnetic recording of the conventional configuration explained in FIG. 1 to FIG. 4 will be explained assigned the same reference numerals.

Figure 5A:
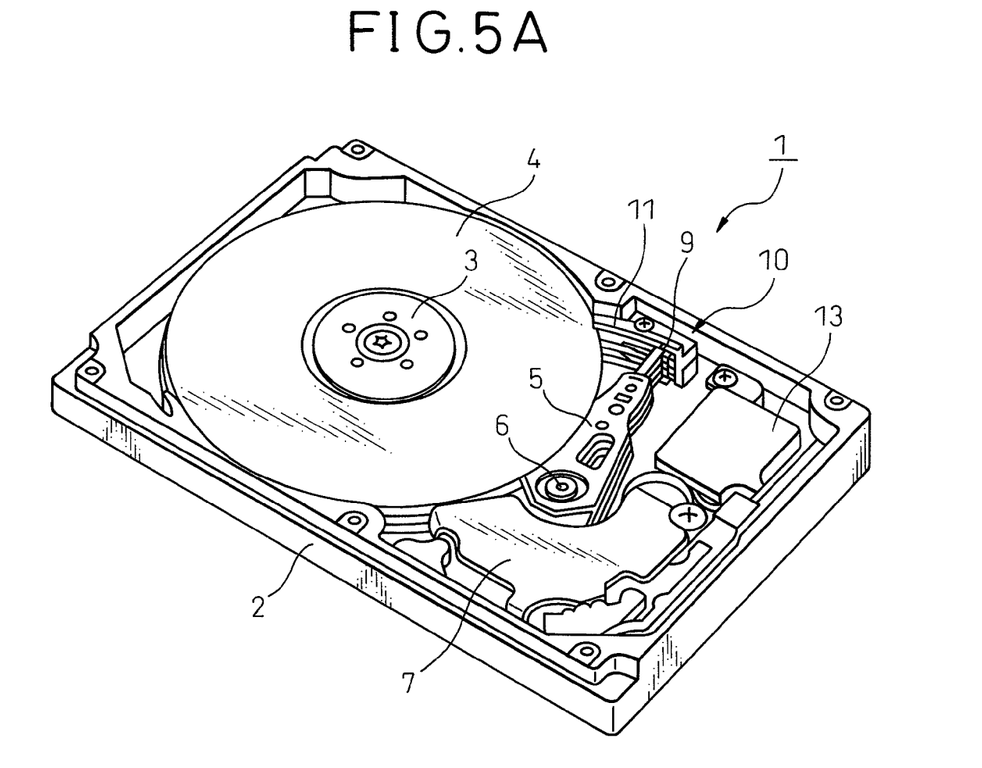
FIG. 5A is a perspective view of the schematic configuration of a hard disk device provided with a magnetic recording medium.
Figure 5B:
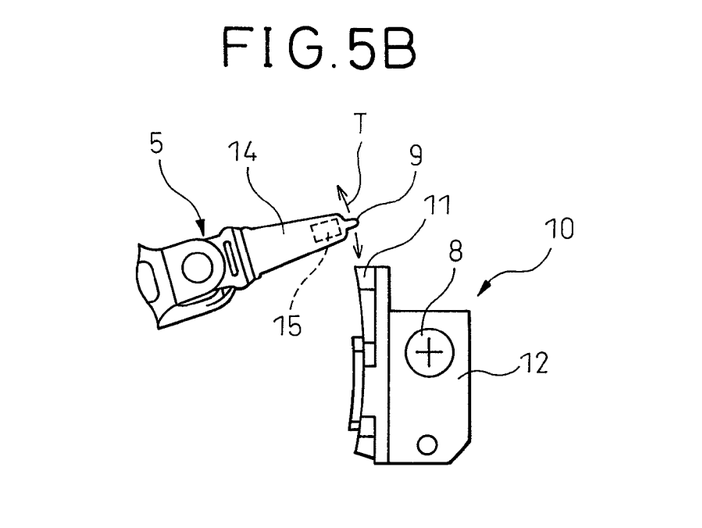
FIG. 5B is a partially enlarged plan view showing part of FIG. 5A partially enlarged.

FIG. 5A shows the configuration of an example of a storage device using a magnetic recording medium 4 as a disk shaped storage medium, that is, a load/unload type hard disk device (hereinafter called "HDD") 1. Further, FIG. 5B shows the position of the head slider 15 at the HDD 1 shown in FIG. 5A. A plurality of magnetic recording media 4 may also be provided. A spindle motor 3 provided on one side of the base 2 of the HDD 1 is used to rotate them.

On the other side of the base 2 of the HDD 1, there are a swing arm 5 swinging about an axis of rotation 6, a voice coil motor 7 which drives this swing arm 5, and a signal processing board 13. At the front end of the swing arm 5, there is a suspension 14. This suspension 14 has attached to it a head slider 15 provided with a head for accessing the magnetic recording medium 4 and reading and writing data.

Further, in the load/unload type HDD 1, at the time of unloading, the head is retracted to the outside of the magnetic recording medium 4. For this reason, the load/unload type HDD 1 is provided with a ramp mechanism 10 for holding the front end of the suspension 14 on the base 2 near the outer circumference of the magnetic recording medium 4. The ramp mechanism 10 has a ramp 11 for holding a lift tab 9 provided at the front end of the suspension 14. The ramp mechanism 10 is provided on the base 2 at the outside of the magnetic recording medium 4.

At the front end of the suspension 14 where the head slider 15 is provided, a lift tab 9 for holding the swing arm 5 at the ramp 11 is provided. The surface of the ramp 11 at the swing arm side becomes the circumferential surface matching the rotational path T of the swing arm 5. For this reason, the lift tab 9 rides up on the ramp 11 by the rotation of the swing arm 5 and is held at the outside of the magnetic recording medium 4 by the ramp 11. The body 12 of the ramp mechanism 10 is fastened to the base 2 by screws 8.

Figure 6A:
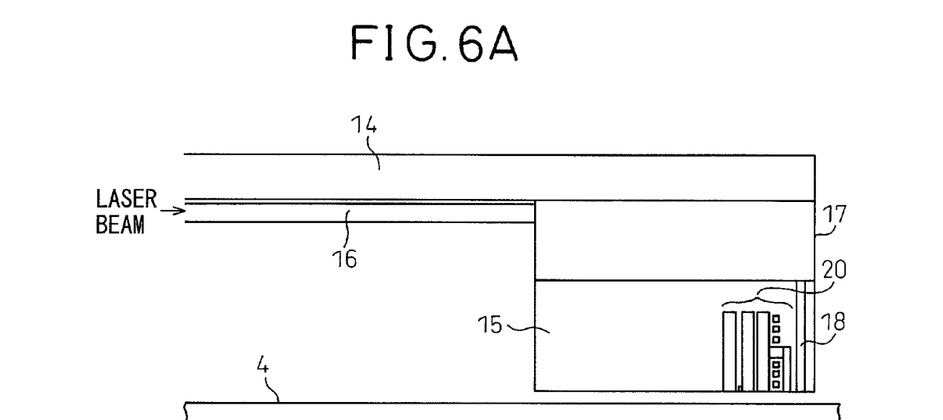
FIG. 6A is a cross-sectional view of the configuration of an example of a head slider attached to a front end of a suspension shown in FIG. 5B.
Figure 6B:
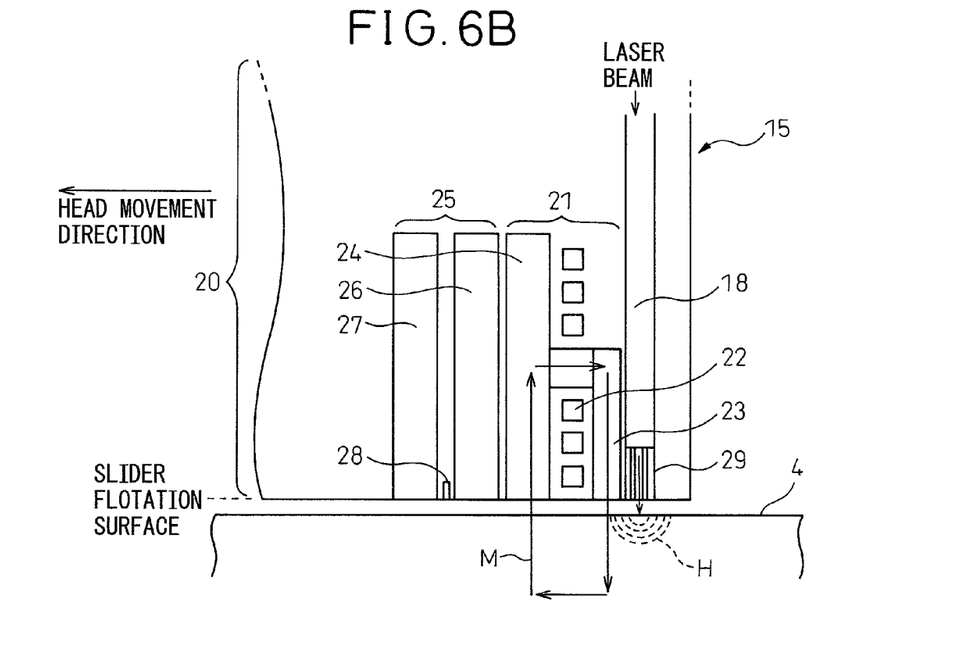
FIG. 6B is a partially enlarged plan view of FIG. 6A.

FIG. 6A is a cross-sectional view showing the configuration of an example of the head slider 15 attached to the front end of the suspension 14 shown in FIG. 5A and FIG. 5B, while FIG. 6B is a partially enlarged cross-sectional view of FIG. 6A. In this example, as the heating means for locally heating the magnetic recording medium 4, a laser beam is used. The source of generation of the laser beam is known, so an explanation will be omitted, but the source of generation of the laser beam is, for example, provided at the signal processing board 13 etc. of FIG. 5A. The laser beam fired from the source of generation of the laser beam is guided by an optical fiber through the swing arm 5 to the suspension 14. Further, at the time of recording, the magnetic recording medium 4 is locally heated, so a pulse power supply or pulse modulation circuit may also be provided at the signal processing board 13.

FIG. 6A shows the state where the optical fiber 16 guiding this laser beam is set below the suspension 14. In this example, at the front end of the suspension 14, the head slider 15 is attached through a coupling lens 17. The optical fiber 16 is connected to this coupling lens 17. The head slider 15 is provided with a magnetic head 20 shown in detail in FIG. 6B. At the front end side of the magnetic head 20, an optical waveguide 18 connected to a coupling lens 17 is provided. At the front end of the optical waveguide 18, a multilayer film 29 comprised of Si, $SiO_2$, etc. stacked together is provided. The multilayer film 29 is exposed at the floating surface of the head slider 15. The laser beam passing through the optical waveguide 18 passes through this multilayer film 29. The reduced light spot is fired toward the magnetic recording medium 4 and partially heats the magnetic recording medium 4 shown by reference symbol H. The part of the multilayer film 29 firing the laser beam is also called the "optical head".

As shown in FIG. 6B, the magnetic head 20 is configured by the three head parts of the record head 21, playback head 25, and optical head 29. The record head 21 is configured from a magnetic excitation coil 22, write magnetic pole 23, and yoke 24. The arrow M shown in this figure shows the flow of magnetic flux at the time of recording. The playback head 25 is provided with a playback element 28 sandwiched between the two shield layers 26, 27. For the playback element 28, a magnetoresistance effect element (MR head) was often used, but at the present time, a gigantic magnetoresistance effect element (GMR head) or tunnel magnetoresistance effect type element (TMR head) with a further larger playback sensitivity and recording density are being used. The optical waveguide 18 and optical head 29 are provided adjoining the write magnetic pole 23.

In the above configured thermally assisted magnetic recording system HDD 1, as the magnetic recording medium 4, the point of efficiently generating heat at the recording layer and point of reducing the size of the heat distribution reaching the necessary temperature at the recording layer are important. The inventors discovered that the smaller the refractive index (n) of the layer arranged at a distance of less than tens of nm or so below the recording layer, the more it is possible to increase the field intensity in the recording layer by calculation. Therefore, if placing a material having a small refractive index below the recording layer to increase the amount of light supplied to the recording layer, it was possible to efficiently generate heat at the recording layer.

Further, a layer of a material positioned between an oxide with a small temperature diffusion coefficient and a metal with a large temperature diffusion coefficient was placed below the recording layer. This is so as not to broaden the heat distribution by the heat insulating layer formed by an oxide with a small temperature diffusion coefficient and to prevent the heat from escaping too much due to a heat radiation layer with a large temperature diffusion coefficient such as a metal and increasing the amount of light. By arranging the heat retention layer simultaneously realizing a material with a small refractive index and a temperature diffusion coefficient of a medium extent under the recording layer, it was possible to increase the amount of light supplied to the recording layer so as to efficiently generate heat at the recording layer. Here, the temperature diffusion coefficient being of a "medium extent" means that the temperature diffusion coefficient is of an extent higher than glass and lower than a metal. Based on the above, the configuration of a specific example of the magnetic recording medium in this application will be explained below. Note that, in the following explanation, the configuration of the magnetic recording medium for horizontal recording is made the first aspect, while the configuration of the magnetic recording medium for perpendicular recording is made the second aspect.

Figure 7:
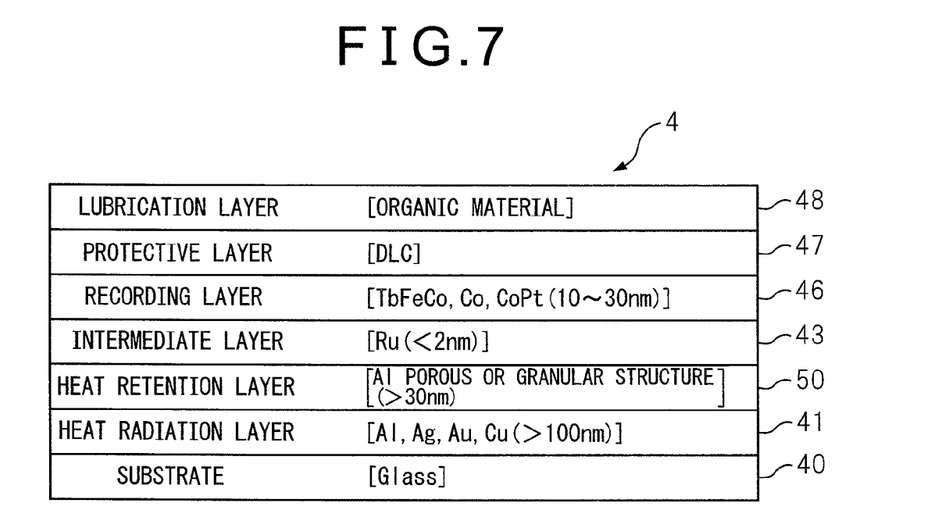
FIG. 7 is a cross-sectional view showing the configuration of a first aspect of the magnetic recording medium of the present application.

FIG. 7 shows the configuration of the magnetic recording medium 4 of the first aspect in the present application. In the first aspect, on the support substrate 40 of the magnetic recording medium 4, a heat radiation layer 41, heat retention layer 50, intermediate layer 43, recording layer 46, protective layer 47, and lubrication layer 48 are stacked in that order. The lubrication layer 48 becomes the surface facing the magnetic head 20 carrying the optical head 29 (see FIG. 6). The laser beam from the optical head passes through the lubrication layer 48 and protective layer 47 to be fired to the recording layer 46. Therefore, the lubrication layer 48 and the protective layer 47 should be made transparent to the fired laser beam, but in this example, for the lubrication layer 48, an organic material is used, while for the protective layer 47, DLC (diamond like carbon) is used. These are not necessarily transparent. This is because the lubrication layer 48 and the protective layer 47 are several nm or so in thickness, so the absorption of light cannot be ignored. Note that the laser beam fired is, for example, a laser beam of a wavelength $\lambda$ of 400 nm.

For this recording layer 46, a material satisfying the three characteristics of the magnetic characteristic, the optical characteristic with the large $n_r \cdot n_i$ in the complex refractive index $n^* = n_r - n_i$, and the temperature characteristic with the small temperature diffusion coefficient is used. Here, $n_r$ is the refractive index, while $n_i$ is the attenuation coefficient. However, in a continuous film structure such as shown in FIG. 7, it is difficult to select a material simultaneously satisfying these three characteristics. On the other hand, the temperature diffusion coefficient can be improved by the structure of the recording layer 46. For example, by separation by an oxide or an air layer with a small temperature diffusion coefficient for each recording bit such as with a bit patterned medium, it is possible to reduce the temperature diffusion coefficient on a macro basis. Further, it is known that by bit patterning, the light fired from the optical head becomes localized and the light spot can be reduced. Note that, the recording layer 46 is generally configured by several layers. Here, the material of the recording layer is not the gist of the invention, so the explanation will be omitted, but the recording layer 46 may for example be configured by cobalt [Co] ($n^* = 1.6-2.75j$ @400 nm, $\alpha = 2.7E-7$). Here, j shows the number of complexes, @400 nm is the value of $\alpha$ at the wavelength of 400 nm, and 2.7E−7 shows 2.7 to the minus 7 power.

For the substrate 40, in a magnetic recording medium 4 for a magnetic disk device, aluminum or glass is used. In the magnetic recording medium 4 of the present application, glass is used for the substrate 40. The heat radiation layer 41 is a continuous film located between the heat retention layer 50 and the substrate 40. The temperature diffusion coefficient $\alpha$ becomes the relation ($\alpha$ of heat radiation layer 41 > $\alpha$ of recording layer 46 ≧ $\alpha$ of heat retention layer 50). As the material with the large temperature diffusion coefficient $\alpha$, there is aluminum [Al] ($\alpha = 9.4E-5$), copper [Cu] ($\alpha = 1.2E-4$), gold [Au] ($\alpha = 1.3E-4$), or another metal.

The heat retention layer 50 simultaneously realizing a material with a small refractive index and a temperature diffusion coefficient with a medium extent is arranged between the recording layer 46 and the substrate 40. Further, for this heat retention layer 50, a material with a refractive index of n<1 is used. As the material with a refractive index of n<1, indium [In] ($n^* = 0.48-3.878j$ @ 400 nm, $\alpha = 4.8E-5$) or high temperature annealed zirconium nitride [ZrN] (0.99-0.01j @ 400 nm, $\alpha$=unknown) may be used.

The In used for the heat retention layer 50 or the high temperature annealed ZrN are special materials. Aside from these special materials, Al ($n^* = 0.4-4.45j$ @ 400 nm $\alpha = 9.4E-5$), Cu ($n^* = 0.86-1.98j$ @ 400 nm $\alpha = 1.2E-4$), or other metals or alloys including these may be generally used. However, Al, Cu, and alloys containing these have a large temperature diffusion coefficient $\alpha$ as metal material.

Figure 8:
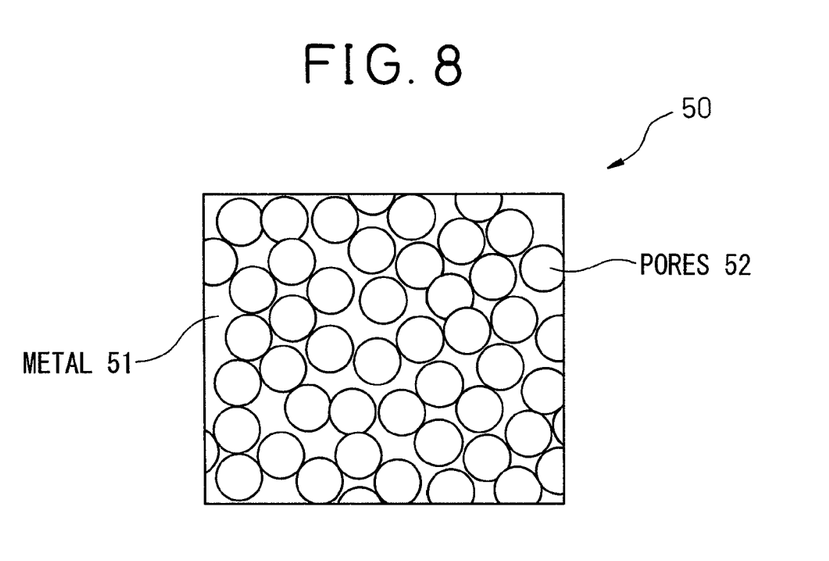
FIG. 8 is a view of the configuration explaining the configuration of a first example of the heat retention layer of the magnetic recording medium of the present application.

Therefore, in the first example, the heat retention layer 50, as shown in FIG. 8, is made a porous structure comprised of a metal material 51 formed around pores 52. For the method of preparation of the porous structure of the heat retention layer 50, there are the gas injection method of directly blowing gas into the molten metal, the one-directional solidification method of forming air bubbles utilizing the difference in solubility of gases included in the molten metal at the time of change from a liquid to a solid, etc. These methods are used for forming the porous structure, then the surface is flattened by chemical mechanical polishing (CMP), then the process of formation of the recording layer is shifted to.

By lowering the density $\rho$ of the metal material in this way, the heat conductivity rate k and heat capacity (Cp·$\rho$) fall (Cp is the specific heat). The heat conductivity rate k is by experience made a 1.6 to 1.8 power of the change of density. That is, if the change of density is 0.5, the heat conductivity rate $\alpha$ changes by exactly 0.33 to 0.29=(0.5 to the 1.6 to 1.8 power). For example, if the density of the low refractive index Al is made 42%, the heat conductivity rate becomes equal to Co, while if the density of the Al is made 27%, the heat conductivity rate becomes half that of Co. In this way, the reduction in the heat conductivity rate is larger than the heat capacity, so by changing the density, it is also possible to lower the temperature diffusion coefficient. That is, it is possible to suppress the drop in temperature from the recording layer 46 and possible to heat the recording layer 46 to the necessary Curie temperature.

In this way, in the first example, as the metal material configuring the heat retention layer 50, Al, Cu, or an alloy of these having a small refractive index (n<1) and a large temperature diffusion coefficient $\alpha$ is used. The alloy may also include Au. Further, as shown in FIG. 8, by making these metal materials 51 porous structures, the temperature diffusion coefficient α was made a medium extent. As a result, it is possible to place a heat retention layer 50 simultaneously realizing both a small refractive index and a temperature diffusion coefficient of a medium extent under the recording layer 46 and possible to increase the amount of light supplied to the recording layer 46 and efficiently generate heat by the recording layer 46.

Figure 9:
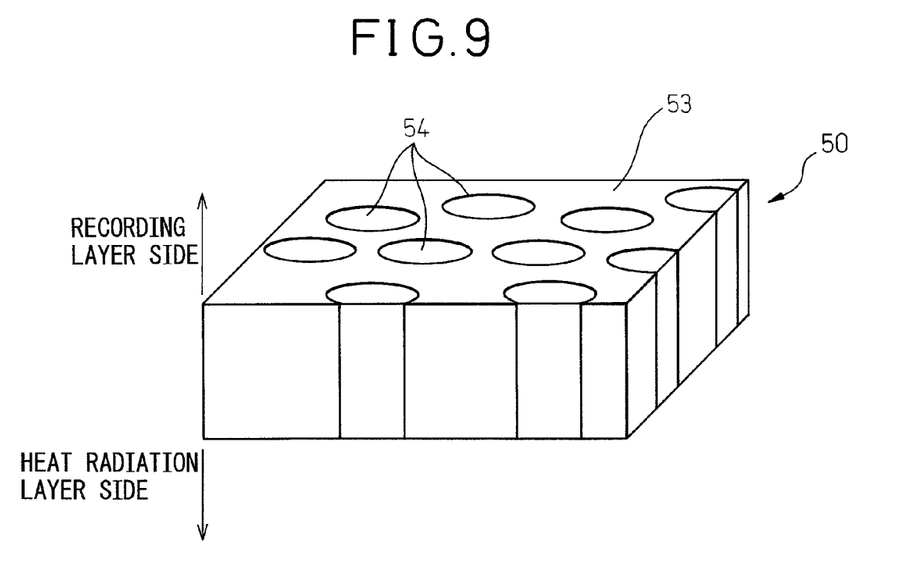
FIG. 9 is a view of the configuration explaining the configuration of a second example of the heat retention layer of the magnetic recording medium of the present application.

The magnetic recording medium 4 of the second example of this application is provided with the configuration shown in FIG. 9. This differs from the first example explained above in only the configuration of the heat retention layer 50. Accordingly, in the second example, only the configuration of the heat retention layer 50 will be explained.

FIG. 9 shows the structure of the heat retention layer 50 of the second example. In the second example, the Al, Cu, or other metal material 54 with a refractive index of n<1 and a large temperature diffusion coefficient α is made a granular structure isolated by an oxide-based oxide material 53. The oxide material 53 is $SiO_2$ (n*=1.47-0.0j @ 400 nm, α=5.8E−7), tantalum pentaoxide [$Ta_2O_5$] (n*=2.23-0.0j @ 400 nm α=2.3E−6), or another dielectric material. By changing the ratio of the n<1 metal material 54 and oxide material 53, the effective refractive index and the temperature diffusion coefficient α due to the change of density are lowered. The Al or Cu is isolated by oxide to reduce the temperature diffusion coefficient α caused by the structure.

The method of preparation of the granular structure of the heat retention layer 50 is, for example, as follows. First, a metal film is formed, then an electron beam lithography system is used for patterning. Next, an RIE (reactive ion etching) or ion milling system is used for patterning, then an oxide film is formed. Furthermore, the surface is flattened by chemical mechanical polishing (CMP), then the process of preparation of the recording layer 46 is shifted to.

In this way, in the second example, as the metal material configuring the heat retention layer 50, the Al, Cu, or other metal material 54 with a refractive index of n<1 and a large temperature diffusion coefficient α was made a granular structure isolated by the oxide-based oxide material 53 to make the temperature diffusion coefficient α a medium extent. As a result, it is possible to place a heat retention layer 50 simultaneously realizing a small refractive index and a temperature diffusion coefficient of a medium extent under the recording layer 46 and possible to increase the amount of light supplied to the recording layer 46 to efficiently generate heat at the recording layer 46.

Figure 10:
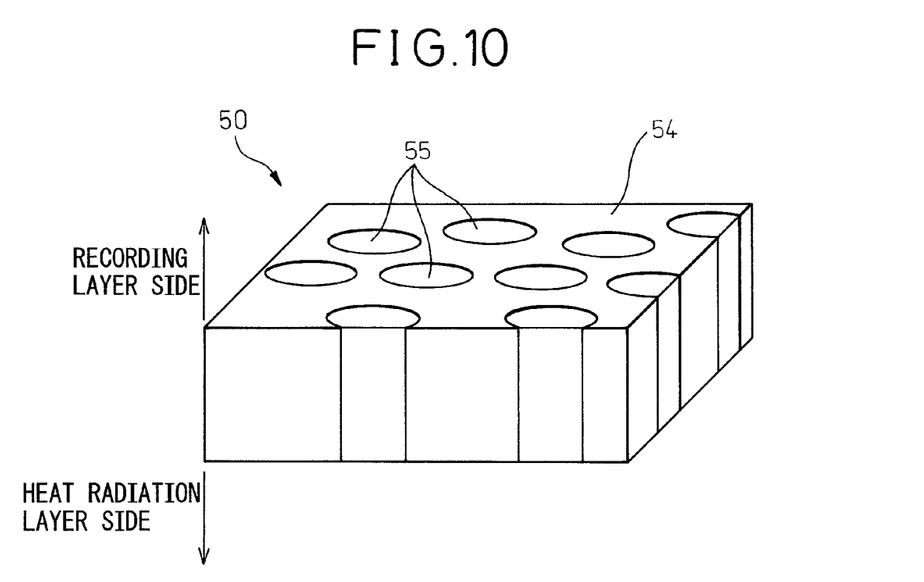
FIG. 10 is a view of the configuration for explaining the configuration of a third example of the heat retention layer of the magnetic recording medium of this application.

The magnetic recording medium 4 of the third example of this application is provided with the configuration shown in FIG. 10. The first and second examples explained above differ in only the configuration of the heat retention layer 50. Therefore, in the third example, only the configuration of the heat retention layer 50 will be explained.

FIG. 10 shows the structure of the heat retention layer 50 of the third example. In the third example, the Al, Cu, or other metal material 54 with a refractive index of n<1 and large temperature diffusion coefficient α is made a granular structure with columnar pores 55. In the third example, by changing the density of the n<1 metal material 54 by providing the pores 55 etc., the effective refractive index and the temperature diffusion coefficient α due to the change of density fall.

In the third example as well, it is possible to place a heat retention layer 50 simultaneously realizing a small refractive index and a temperature diffusion coefficient of a medium extent under the recording layer 46 and possible to increase the amount of light supplied to the recording layer 46 so as to efficiently generate heat at the recording layer 46.

Figure 11:
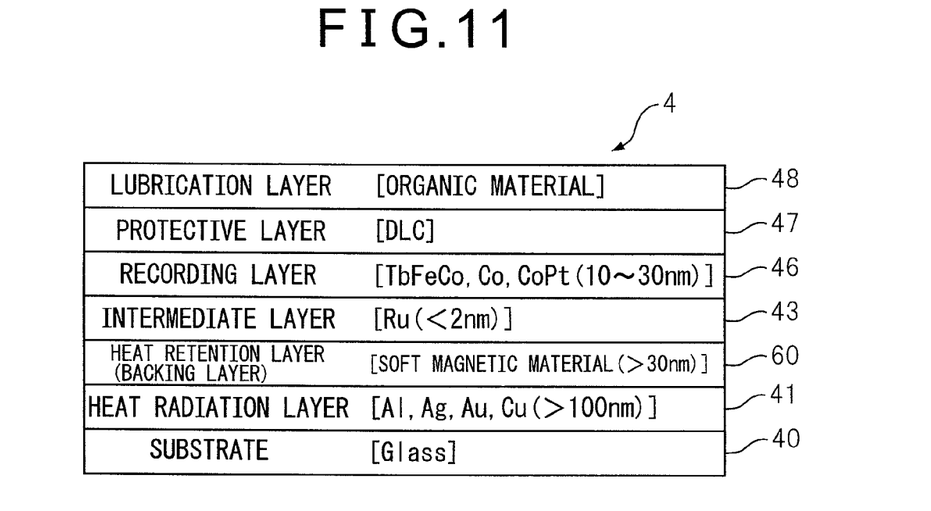
FIG. 11 is a cross-sectional view showing the configuration of a second aspect of the magnetic recording medium of this application.

Next, the configuration of the magnetic recording medium 4 for perpendicular recording of the second aspect of the present application will be explained using FIG. 11. The magnetic recording medium 4 used for perpendicular magnetic recording is comprised of a recording layer 46 under which an intermediate layer 43 and soft magnetic backing layer 60 are provided. Therefore, in a second aspect, on the support substrate 40 of the magnetic recording medium 4, a heat radiation layer 41, heat retention layer (backing layer) 60, intermediate layer 43, recording layer 46, protective layer 47, and lubrication layer 48 are stacked in this order. The lubrication layer 48 becomes the surface facing the magnetic head 20 carrying the optical waveguide 18 (see FIG. 6). The lubrication layer 48, protective layer 47, recording layer 46, intermediate layer 43, heat radiation layer 41, and substrate 40 are the same in configuration as the first aspect, so here the explanations of these will be omitted. Further, the laser beam fired is, for example, a laser beam of a wavelength λ=400 nm.

The heat retention layer 60 in the magnetic recording medium 4 of the second aspect requires, in addition to the two conditions of the first aspect of the small refractive index of the material in the heat retention layer 50 and the temperature diffusion coefficient of a medium extent, and the condition of the material of the heat retention layer 60 being a soft magnetic material. Therefore, for the heat retention layer 60, a metal material with a low refractive index, but a high temperature diffusion coefficient or an oxide material with a refractive index of a medium extent and a low temperature diffusion coefficient cannot be used to form a film as they are. Therefore, in the second aspect as well, by making the metal material with a low refractive index and a high temperature diffusion coefficient a porous structure or a granular structure using a metal and oxide, the temperature diffusion coefficient is lowered. The configuration of the heat retention layer 60 of the second aspect will be explained below as fourth and fifth examples.

Figure 12:
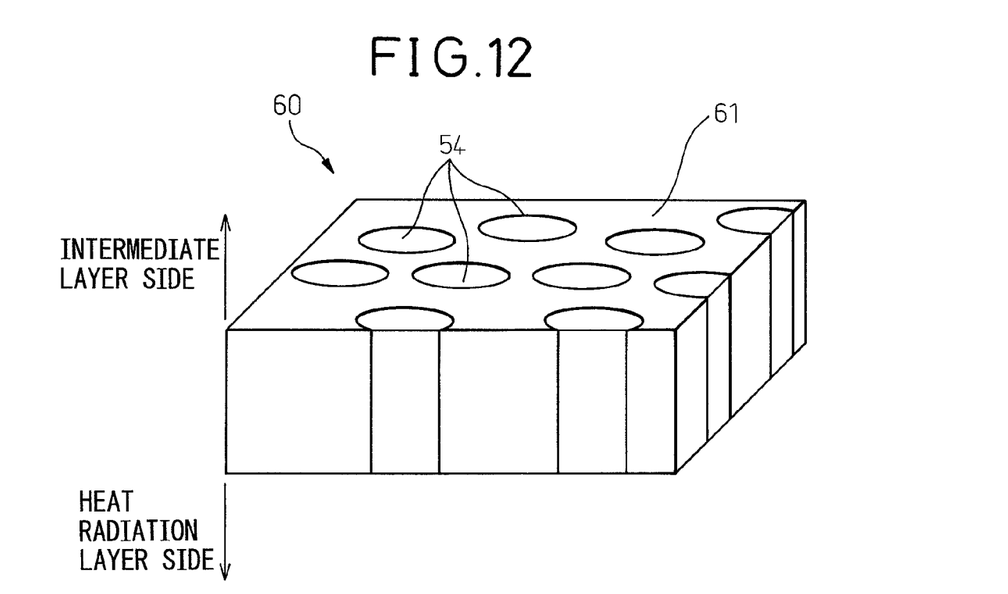
FIG. 12 is a view of the configuration explaining the configuration of a fourth example of the heat retention layer of the magnetic recording medium of the present application.

FIG. 12 shows the structure of the heat retention layer 60 of the fourth example of this application. In the fourth example, to make the heat retention layer 60 a soft magnetic backing layer, a soft magnetic material with a refractive index of n>1 and containing iron [Fe], nickel [Ni], etc., for example, nickel iron [FeNi] etc. is stacked. Here, it is Fe (n*=2.87-3.27j @ 400 nm, α=2.3E−5), Ni (n*=1.44-2.44j @ 400 nm, α=2.3E−5), and Co (n*=1.6-2.75j @ 400 nm, α=2.7E−7).

Further, soft magnetic backing layer has the problem of a large noise due to the magnetic walls, called "spike noise", so in general is not used in a single layer. For example, a plurality of layers of several nm of ruthenium [Ru] are used stacked to control the magnetic domains. Further, the soft magnetic backing layer is made a thickness of 100 nm or more. In this way, the soft magnetic backing layer is thick and made a multilayer structure. Therefore, to increase the amount of light in the thermally assisted magnetic recording system, the refractive index of the soft magnetic layer is made n<1.

In the fourth example, as shown in FIG. 12, a magnetically transparent Al, Cu, or other metal material 54 with a refractive index of n<1 was made a granular structure isolated using a soft magnetic material 61. Due to this, the refractive index of the metal material 54 is effectively lowered. The Al or Cu is isolated since the temperature diffusion coefficient α of the Al or Cu is larger than the soft magnetic material, so if isolating the soft magnetic material, the temperature diffusion coefficient becomes larger.

In the fourth example as well, it is possible to place a heat retention layer 60 simultaneously realizing both a small refractive index and a temperature diffusion coefficient of a medium extent placed under the recording layer 46 and increase the amount of light supplied to the recording layer 46 to efficiently generate heat at the recording layer 46.

Figure 13:
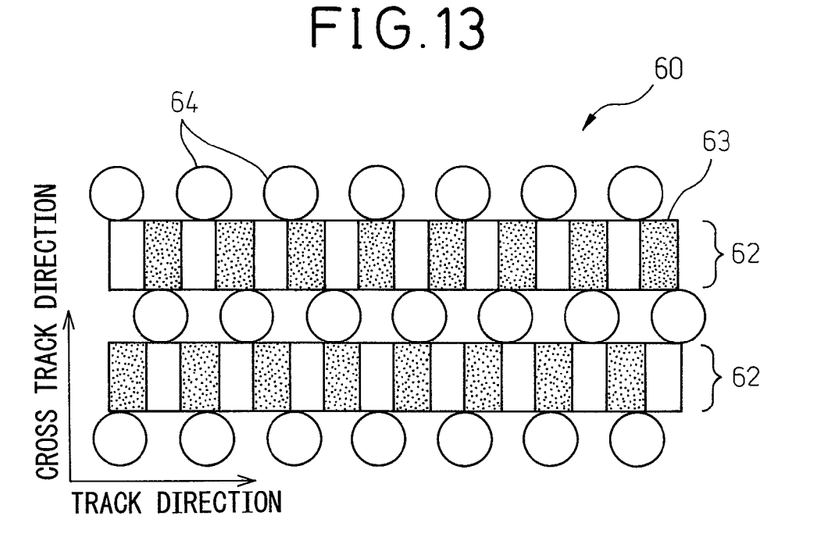
FIG. 13 is a view of the configuration explaining the configuration of a fifth example of the heat retention layer of the magnetic recording medium of the present application.
Figure 14:
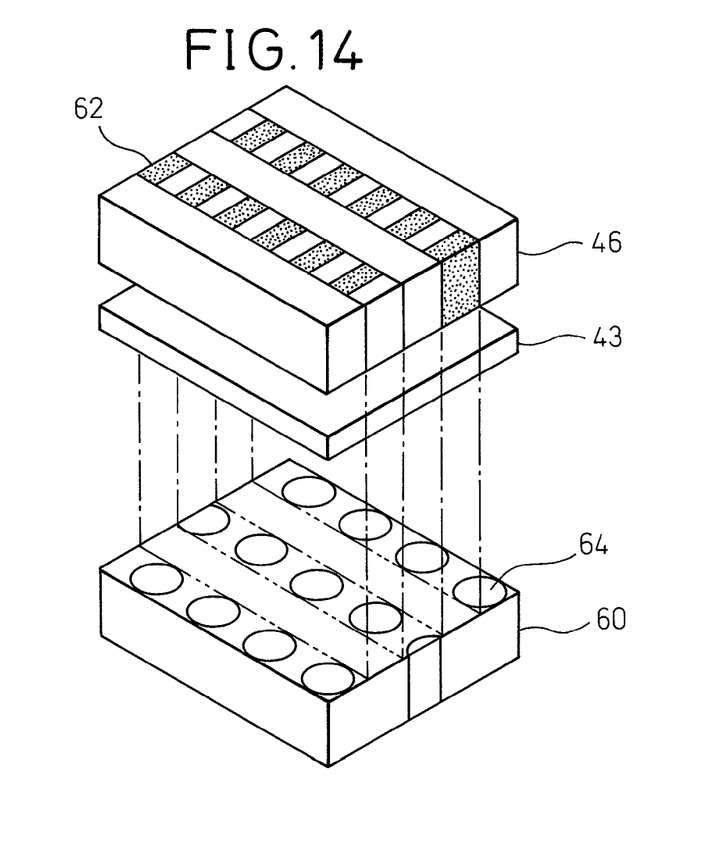
FIG. 14 is an assembled perspective view explaining the configuration of the heat retention layer, intermediate layer, and recording layer of the magnetic recording medium shown in FIG. 13.

FIG. 13 and FIG. 14 show the structure of the heat retention layer 60 of the fifth example in this application. In the fifth example, the positional relationship of the isolated material 64 in the granular structure of the heat retention layer 60 and the recording track 62 of the recording layer 46 is defined. In the fifth example, when viewing the magnetic recording medium 4 by a plan view, the material 64 isolated at the heat retention layer 60 is prevented from overlapping the recording tracks 62 in the recording layer 46 of the layer above the heat retention layer 60. 63 is a pit of the recording track 62.

In this way, by arranging the isolation material 64 at the heat retention layer 60 in the thickness direction of the magnetic recording medium 4 so as to not cut across the recording tracks 62, it was possible to reduce the temperature distribution in the recording track 62 direction. Further, by making the isolation material 64 a material with a large temperature diffusion coefficient α, it is possible to lower the temperature rise between recording tracks 62 (cross track direction) and possible to reduce cross track erase.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A magnetic recording medium used for thermally assisted magnetic recording system provided with
a substrate configured by glass,
a heat radiation layer provided on said substrate,
a heat retention layer provided on said heat radiation layer, and
a recording layer provided on said heat retention layer via an intermediate layer; and
said heat retention layer configured by a member having an effective refractive index lower than the effective refractive index of said recording layer and having a temperature diffusion coefficient determined by a specific heat, density, and heat conductivity rate higher than glass and lower than a metal, and
wherein a temperature diffusion coefficient of the member configuring said heat retention layer is made higher than glass and lower than a metal using a temperature diffusion coefficient changing means for changing a ratio of materials configuring this heat retention layer or a density of the same; and
as the material of the member configuring said heat retention layer, a nonmagnetic material with a refractive index of n<1 at the wavelength of a laser beam is used and, as said temperature diffusion coefficient changing means, a porous structure able to change the density is used.

2. A magnetic recording medium used for thermally assisted magnetic recording system provided with
a substrate configured by glass,
a heat radiation layer provided on said substrate,
a heat retention layer provided on said heat radiation layer, and
a recording layer provided on said heat retention layer via an intermediate layer; and
said heat retention layer configured by a member having an effective refractive index lower than the effective refractive index of said recording layer and having a temperature diffusion coefficient determined by a specific heat, density, and heat conductivity rate higher than glass and lower than a metal, and
wherein a temperature diffusion coefficient of the member configuring said heat retention layer is made higher than glass and lower than a metal using a temperature diffusion coefficient changing means for changing a ratio of materials configuring this heat retention lager or a density of the same;
wherein as the material of the member configuring said heat retention layer, a nonmagnetic material with a refractive index of n<1 at the wavelength of a laser beam and, as said temperature diffusion coefficient changing means, a granular structure with pores able to change the density is used.

3. A magnetic recording medium used for thermally assisted magnetic recording system provided with
a substrate configured by glass,
a heat radiation layer provided on said substrate,
a heat retention layer provided on said heat radiation layer, and
a recording layer provided on said heat retention layer via an intermediate layer; and
said heat retention layer configured by a member having an effective refractive index lower than the effective refractive index of said recording layer and having a temperature diffusion coefficient determined by a specific heat, density, and heat conductivity rate higher than glass and lower than a metal, and
wherein
as the material of the member configuring said heat retention layer, a continuous single layer film of ZrN or In annealed to give a refractive index n≦1 of is used.

4. A magnetic recording medium as set forth in claim 1, wherein
said nonmagnetic material with a refractive index of n<1 is a material containing at least one of Al, Cu, and Au.

5. A magnetic recording medium as set forth in claim 2, wherein said nonmagnetic material with a refractive index of n<1 is a material containing at least one of Al, Cu, and Au.

6. A magnetic recording medium as set forth in claim 3, wherein the material of the member configuring said heat retention layer is a continuous single layer film of In annealed.

* * * * *